US008618917B2

(12) United States Patent
Innes et al.

(10) Patent No.: US 8,618,917 B2
(45) Date of Patent: Dec. 31, 2013

(54) APPARATUS, SYSTEMS AND METHODS FOR REMOTE CONTROL LEARNING

(75) Inventors: David A. Innes, Littleton, CO (US); Nathan Hale, Denver, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 885 days.

(21) Appl. No.: 12/697,876

(22) Filed: Feb. 1, 2010

(65) Prior Publication Data
US 2011/0187491 A1 Aug. 4, 2011

(51) Int. Cl.
*G05B 11/01* (2006.01)

(52) U.S. Cl.
USPC .................. 340/12.23; 340/12.24; 340/12.25; 341/176

(58) Field of Classification Search
USPC ........................... 340/12.22–12.29, 4.3–4.33; 341/175–176; 398/112; 348/E5.103, 348/734
See application file for complete search history.

(56) References Cited

U.S. PATENT DOCUMENTS

| | | | |
|---|---|---|---|
| 5,237,319 A * | 8/1993 | Hidaka et al. | 340/12.28 |
| 5,675,323 A * | 10/1997 | Ho | 340/5.6 |
| 6,130,625 A | 10/2000 | Harvey | |
| 6,195,033 B1 * | 2/2001 | Darbee et al. | 341/176 |
| 6,225,938 B1 * | 5/2001 | Hayes et al. | 341/176 |
| 6,590,505 B1 * | 7/2003 | Matsui et al. | 340/12.28 |
| 6,771,182 B1 | 8/2004 | Loh et al. | |
| 7,429,932 B1 * | 9/2008 | Newell et al. | 340/12.24 |
| 2006/0041655 A1 | 2/2006 | Holloway et al. | |
| 2008/0174468 A1 * | 7/2008 | Drimusz | 341/176 |
| 2009/0289829 A1 * | 11/2009 | Maier | 341/176 |

* cited by examiner

*Primary Examiner* — Mohammad Ghayour
*Assistant Examiner* — Nay Tun
(74) *Attorney, Agent, or Firm* — Lowe Graham Jones PLLC

(57) ABSTRACT

Device control systems and methods learn to control an electronic device. An exemplary embodiment has a base device and a learning remote control. The learning remote control receives a device command signal transmitted from a remote control that controls the controlled electronic device. The base device receives a first identifier associated with a first input interface of the learning remote control, a second identifier associated with a second input interface of the learning remote control, and device control information from the learning remote control, wherein the received device control information includes information corresponding to the device command signal. The base device determines device instruction code information enabling the learning remote control to generate and transmit an emulated device command signal that is substantially the same as the device command signal when the learning remote control receives signals generated by the first input interface and the second input interface.

18 Claims, 2 Drawing Sheets

APPARATUS, SYSTEMS AND METHODS FOR REMOTE CONTROL LEARNING

BACKGROUND

Electronic devices, such as a set top box, a stereo, a television, a computer system, a game system, or the like, are often configured to receive operating instructions from a user via a remote control. The remote control communicates user instructions to the electronic device using an infrared signal.

A user may find it inconvenient to keep track of and operate a plurality of different remote controls that are each uniquely configured to control their respective electronic device. Thus, universal remote controls are available that are configured to control a plurality of electronic devices. However, a priori knowledge of each possible electronic device that the universal remote control is likely to encounter is required so that the particular operating commands may be pre-stored into the universal remote control. Once a particular electronic device is identified to the universal remote control, the universal remote control may look up the unique remote control commands to operate that particular electronic device.

Since there is a wide proliferation of electronic devices, it is becoming increasingly difficult to configure a universal remote control to operate all possible types of electronic devices that are produced by the large number of electronic device companies. The increasing memory capacity requirements for the universal remote control are thus increasing device costs. And, the operating systems that control the universal remote control are becoming increasingly complex as electronic devices themselves become more complex.

Further, new types and/or configurations of electronic devices frequently appear in the marketplace. The universal remote control cannot pre-store remote control commands for such new devices.

Some universal remote controls are configured to learn remote control commands that control such new electronic devices. However, a significant amount of processing capacity and/or memory capacity is required to support such learning functions. Accordingly, there is a need in the arts for learning-type remote controls that do not require large processing and/or memory capacities.

SUMMARY

Systems and methods of controlling an electronic device are disclosed. An exemplary embodiment has a base device and a learning remote control. The learning remote control receives a device command signal transmitted from a remote control that controls the controlled electronic device. The base device receives a first identifier associated with a first input interface of the learning remote control, a second identifier associated with a second input interface of the learning remote control, and device control information from the learning remote control, wherein the received device control information includes information corresponding to the device command signal. The base device determines device instruction code information enabling the learning remote control to generate and transmit an emulated device command signal that is substantially the same as the device command signal when the learning remote control receives signals generated by the first input interface and the second input interface.

BRIEF DESCRIPTION OF THE DRAWINGS

Preferred and alternative embodiments are described in detail below with reference to the following drawings.

DETAILED DESCRIPTION

Figure 1:
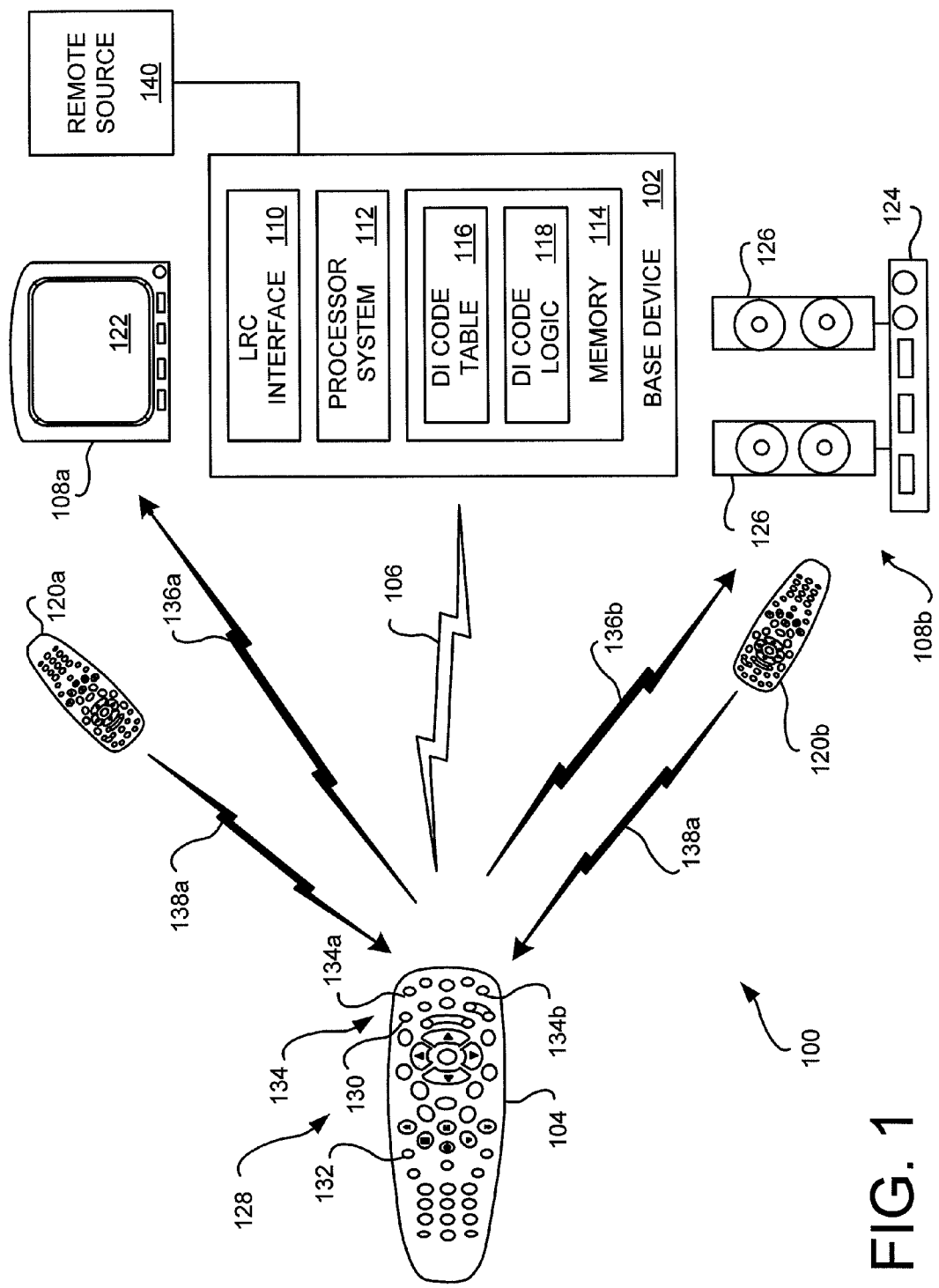
FIG. 1 is a diagram of an embodiment of a remote control command learning system implemented in a base device and a corresponding learning remote control.

FIG. 1 is a diagram of an embodiment of a remote control command learning system 100 implemented in a base device 102 and a corresponding learning remote control 104. The learning remote control 104 is preferably provided with the base device 102 when a user initially acquires the base device 102. In some instances, the learning remote control 104, or even additional learning remote controls 104, may be obtained from the manufacturer or vendor of the base device 102 at a later time. Non-limiting examples of the electronic base device 102 include, but are not limited to, a set top box (STB), stereos, radios, televisions (TVs), digital video disc (DVD) players, digital video recorders (DVRs), game playing devices, personal computers (PCs), home security systems, or home appliances. The base device 102 and the learning remote control 104 are configured to cooperatively learn a plurality of commands that will be used by the learning remote control 104 to control operation of one or more controlled electronic devices 108.

The learning remote control 104 is configured to support two-way communications with its respective base device 102. That is, a communication signal 106 is communicated between the learning remote control 104 and its respective base device 102. An exemplary embodiment is configured to use a suitable RF medium for communication of the communication signal 106 between the learning remote control 104 and the base device 102. Alternatively, or additionally, a suitable IR medium or other suitable communication medium may be used.

The exemplary base device 102 comprises a learning remote control (LRC) interface 110, a processor system 112, and a memory 114. The memory 114 includes portions for storing an optional device instruction (DI) code table 116 and the device instruction (DI) code logic 118.

Embodiments of the remote control command learning system 100 are configured to learn commands from a controlled electronic device 108 based upon corresponding commands received from a remote control 120. The remote control 120 is uniquely configured to control operation of its respective controlled electronic device 108.

For example, the illustrated controlled electronic device 108a is a television that displays programming on its display 122. The remote control 120a is configured to control operation of the television 108a. The illustrated controlled electronic device 108b is a stereo system with a receiver 124 and a plurality of speakers 126. The remote control 120b is configured to control operation of the stereo 108b. Non-limiting examples of other controlled electronic devices 108 that are configured to be controlled by their respective remote control 120 include, but are not limited to, a set top box (STB), radios, digital video disc (DVD) players, digital video recorders (DVRs), game playing devices, personal computers (PCs), home security systems, and home appliances.

Preferably, the remote control 120 controls operation of its respective controlled electronic device 108 using an IR signal medium. Based on actuation of one or more input interfaces on the remote control 120, the user inputs an intended device command. The input of the intended device command causes the remote control 120 to generate and communicate a signal, referred to herein as a device command signal, to its respective controlled electronic device 108. For example, there may be a "power on/off" button on the remote control 120*a* that turns on or turns off the television 108*a*. Upon actuation of the "power on/off" button by the user, the remote control 120*a* generates and communicates an IR device command signal having instruction information therein that causes the television 108*a* to turn on or turn off. Other communication media, such as radio frequency (RF) signals, may be used by the remote control 120 to control its respective controlled electronic device 108.

The learning remote control 104 comprises a plurality of input interfaces 128, such as, but not limited to, the illustrated buttons, controllers and actuators, residing on its surface. Exemplary input interfaces 128 include a "power on/off" button 130, a learning function button 132, and one or more electronic device identifier buttons 134. In some embodiments, the operation functions may be implemented on a touchpad device or the like. For example, the "power on/off" button 130 is configured to turn on or turn off the base device 102. Actuation of the "power on/off" button 130 causes the learning remote control 104 to generate and communicate a device command signal, via the communication signal 106, to the base device 102. The "power on/off" button 130 preferably includes text or the like that indicates to the user that the functionality of this particular button is for turning on or turning off the base device 102. Various communication media, such as IR or RF, may be used by the learning remote control 104 to control its respective base device 102. That is, the learning remote control 104 may transmit an IR device command signal and/or an RF device command signal to the base device 102 having instructions therein that will cause the base device 102 to turn on or turn off.

Embodiments of the remote control command learning system 100 are configured so that the learning remote control 104 emulates device commands of another remote control 120. Upon actuation of the learning function button 132, the remote control command learning system 100 configures itself for operation in a learning mode. When operating in the learning mode, embodiments of the remote control command learning system 100 learn the functionality of the input interfaces on a remote control 120, and learn an associated device command signal that would be transmitted from that particular remote control 120. Then, the learning remote control 104 is configured to generate an emulated device command signal 136 that is substantially identical to the same device command signal transmitted from the remote control 120. That is, when the emulated device command signal 136 is communicated to the controlled electronic device 108 from the learning remote control 104, the controlled electronic device 108 operates in accordance with the emulated device command signal 136.

Unlike legacy remote control learning systems, embodiments of the remote control command learning system 100 are configured to perform portions of the learning function using the processor system 112 and the memory 114 residing in the base device 102. Accordingly, processing capacity and memory capacity of the learning remote control 104 may be less than that of a legacy learning remote control that performs all learning functions on the remote control itself.

Next, the user actuates one of the electronic device identifier buttons 134 to define a designated one of the controlled electronic devices 108. For example, the user may actuate the electronic device identifier button 134*a* such that the learning remote control 104 controls the television 108*a*. As another example, the user may actuate the electronic device identifier button 134*b* for control of the stereo 108*b*. Once the user has actuated a selected one of the electronic device identifier buttons 134, embodiments of the remote control command learning system 100 understand that additional forthcoming commands are intended to be learned for subsequent control of the selected controlled electronic device 108.

After one or more intended device commands have been learned for the selected controlled electronic device 108, subsequent actuation of the learning function button 132 causes the remote control command learning system 100 to exit or end the learning mode of operation. In some embodiments, an input interface 128 may be used to exit or end the learning mode of operation.

Once the learning mode of operation has been initialized, the user positions and orients the remote control 120 associated with the selected controlled electronic device 108 towards the learning remote control 104. When a device command signal 138 is emitted from the remote control 120, the emitted device command signal 138 is received by the learning remote control 104. The learning remote control 104 processes the received device command signal 138 into device control information that is then communicated to the base device 102.

For example, in some applications, the learning remote control 104 and the base device 102 communicate using an RF medium. Further, the remote control 120 communicates with its respective controlled electronic device 108 using an IR medium. That is, the remote control 120 communicates an IR device command signal to its respective controlled electronic device 108. In this operating scenario, the learning remote control 104 converts the information of the received IR device command signal 138 into device control information that is communicated to the base device 102 in an RF communication signal 106.

During the learning process, the user understands precisely which command was intended to be learned for emulation by the learning remote control 104 since it was the user who selected and actuated the input interface on the remote control 120. Next, the user selects and actuates one or more of the input interfaces 128 of the learning remote control 104. The actuated one or more of the input interfaces 128 will, upon conclusion of the learning process, be associated with the user's intended device command. Upon actuation, an identifier or the like associated with the selected one or more input interfaces 128 of the learning remote control 104 is communicated to the base device 102.

At this point in the learning process, the base device 102 has received information that identifies the selected controlled electronic device 108, has received the device control information that corresponds to an intended device command, and has received information that identifies the one or more input interfaces 128 on the learning remote control 104. The processor system 112 retrieves and executes the DI code logic 118 to determine device instruction code information that is associated with the intended device command.

The determined device instruction code information is returned to, and is stored by, the learning remote control 104. The determined device instruction code information is configured to cause the learning remote control 104 to generate and transmit an emulated device command signal 136 to the controlled electronic device 108 such that the controlled electronic device 108 operates in the same manner as if controlled by its own remote control 120. The device instruction code information may be stored in the learning remote control 104 using a device instruction code table or other suitable data format.

At a later point in time, when the user wishes to control the controlled electronic device 108 using the learning remote control 104, the user actuates the electronic device identifier button 134 that has been associated with the controlled electronic device 108. Next, the user actuates the same input interfaces 128 of the learning remote control 104 that have been associated with the intended device command. The learning remote control 104 retrieves the appropriate device instruction code information, and then generates and communicates the emulated device command signal 136 to the controlled electronic device 108 so that it operates as intended by the user.

For example, the user may wish to have the learning remote control 104 learn to turn on or turn off the television 108*a*. The user actuates, such as by depressing, the learning function button 132 so as to place the remote control command learning system 100 into a learning mode of operation. Then, the user positions and orients the remote control 120*a* so that when the user actuates the "power on/off" button on the remote control 120*a*, the transmitted corresponding device command signal 138*a* emitted by the remote control 120*a* is received by the learning remote control 104. The learning remote control 104 processes the received device command signal 138*a* having information therein that will cause the television 108*a* to itself turn on or off. The device control information corresponding to the function of the received device command signal 138*a* is communicated from the learning remote control 104 to the base device 102, via the communication signal 106.

Then, the user actuates the "power on/off" button 130 on the learning remote control 104. An identifier or the like associated with the actuated "power on/off" button 130 is communicated from the learning remote control 104 to the base device 102, via the communication signal 106. The DI code logic 118 is executed so that corresponding device instruction code information associated with the television 108*a* is generated and communicated from the base device 102 to the learning remote control 104, via another communication signal 106.

The user then actuates the learning function button 132, or another suitable button or actuator, to exit or end the learning mode of operation. (Alternatively, the user may repeat the learning process so that other device control functions are learned by the remote control command learning system 100.) Later, when the user wants to turn on or turn off the television 108*a* using the learning remote control 104, the user actuates the electronic device identifier button 134*a*. Then, the user actuates the "power on/off" button 130 (or the other designated input interfaces 128 on the learning remote control 104). The learning remote control 104 then generates and communicates an emulated device command signal 136*a* to the television 108*a*. Since the emulated device command signal 136*a* that is configured to turn on or turn off the television 108*a* is substantially identical to a corresponding device command signal generated by the remote control 120*a*, the television 108*a* turns itself on or off in response to receiving the emulated device command signal 136*a*.

Similarly, the user may wish to have the learning remote control 104 learn to turn on or turn off the stereo 108*b*. The user actuates the learning function button 132 so as to place the remote control command learning system 100 into a learning mode of operation. Then the user positions and orients the remote control 120*b* so that when the user actuates the "power on/off" button on the remote control 120*b*, the transmitted corresponding device command signal 138*b* emitted by the remote control 120*b* is received by the learning remote control 104. The learning remote control 104 processes the received device command signal 138*b* and generates device control information that will cause the stereo 108*b* to turn on or off. The generated device control information is communicated from the learning remote control 104 to the base device 102, via the communication signal 106.

Then, the user actuates the "power on/off" button 130 on the learning remote control 104. An identifier or the like associated with the actuated "power on/off" button 130 is communicated from the learning remote control 104 to the base device 102, via the communication signal 106. The DI code logic 118 is executed so that a corresponding device instruction code information associated with the stereo 108*b* is generated and communicated from the base device 102 to the learning remote control 104.

The user then actuates the learning function button 132, or another suitable button or actuator, to exit or end the learning mode of operation. (Alternatively, the user may repeat the learning process so that other device control functions of the stereo 108*b* are learned by the remote control command learning system 100.) Later, when the user wants to turn on or turn off the stereo 108*b* using the learning remote control 104, the user actuates the electronic device identifier button 134*b* and then actuates the "power on/off" button 130 (or another input interface 128 on the learning remote control 104 that was designated during the learning process). The learning remote control 104 then generates and communicates an emulated device command signal 136*b* to the stereo 108*b*. Since the emulated device command signal 136*b* that is configured to turn on or turn off the stereo 108*b* is substantially identical to a corresponding device command signal generated by the remote control 120*b*, the stereo 108*b* turns on or off.

It is appreciated that the device instruction code information determined by the base device 102 that is used by the learning remote control 104 to generate the emulated device command signal 136*b* is most likely different from the device instruction code information used to generate the similar emulated device command signal 136*a* since the remote control 120*b* is likely different from, and uses different command signals, than the remote control 120*a*.

In some embodiments, the base device 102 is communicatively coupled to a remote source 140. The base device 102 may be communicatively coupled to a remote source 140 via a backchannel coupled to the Internet, via a coaxial cable connection, or via a fiber optic connection.

Figure 2:
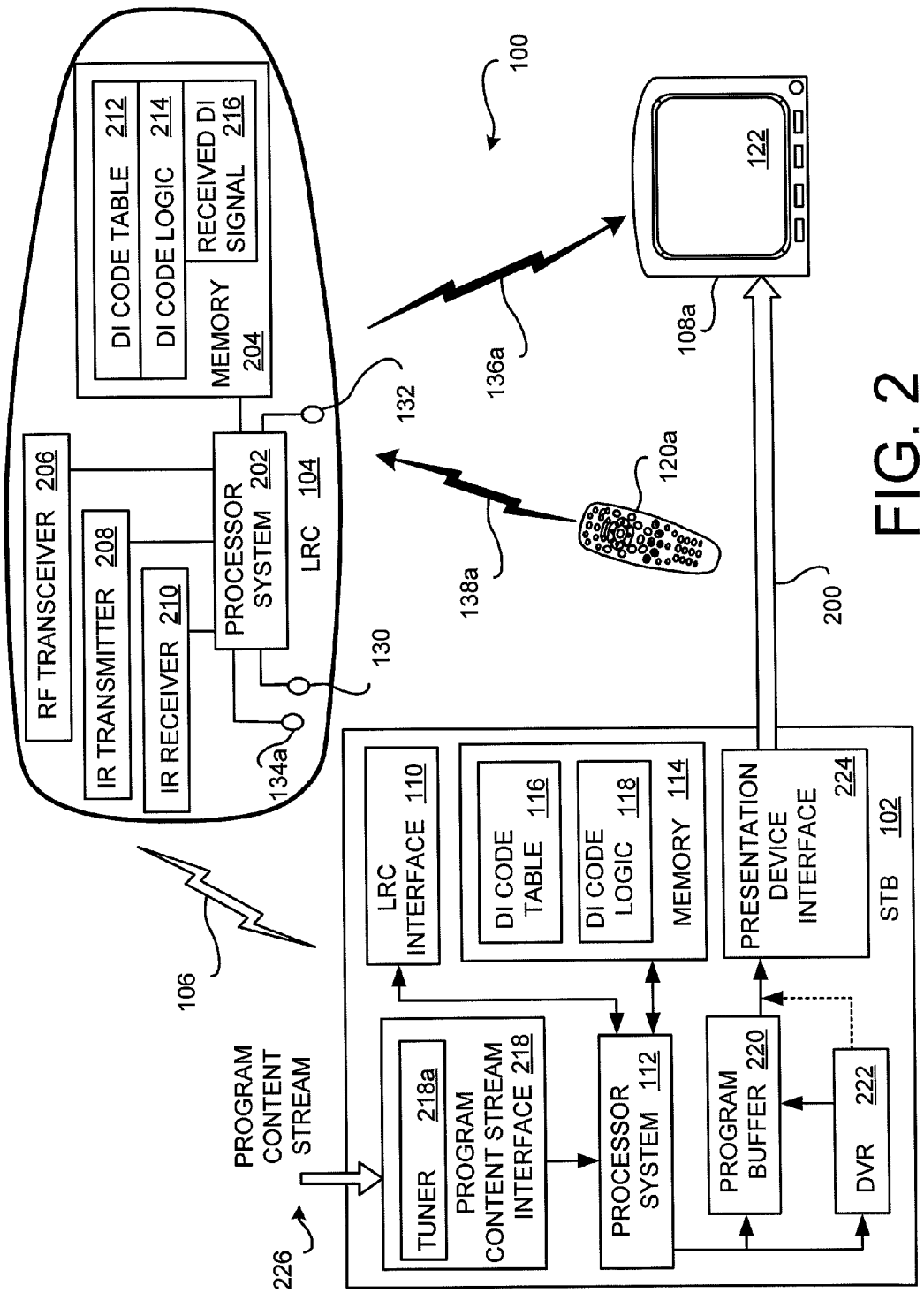
FIG. 2 is a diagram of an embodiment of a learning remote control that communicates with at least one controlled electronic device using an infrared medium.

FIG. 2 is a diagram of an embodiment of a remote control command learning system 100 implemented in a learning remote control 104 that communicates with at least one controlled electronic device 108 using an infrared (IR) medium. The exemplary learning remote control 104 comprises the above-described "power on/off" button 130, the learning function button 132, and the electronic device identifier button 134*a*. The learning remote control 104 further comprises a processor system 202, a memory 204, a RF transceiver 206, an IR transmitter 208, and an IR receiver 210. Other components, not shown, also reside in the learning remote control 104. The plurality of input interfaces 128 on the surface of the learning remote control 104, including the exemplary "power on/off" button 130, the learning function button 132, and the electronic device identifier button 134*a*, generate signals that are received by the processor system 202.

The memory 204 includes portions for storing a device instruction (DI) code table 212, the device instruction (DI) code logic 214, and the processed device instruction (DI) signal 216. When operated in the learning mode, a device command signal 138 is received from a remote control 120 associated with a controlled electronic device 108 of interest. The received device command signal 138 is processed into the device control information that is stored into the received DI signal 216 portion of the memory 204. The stored device control information is then communicated to the base device 102 so that a device instruction code information is generated by the base device 102 for that particular device command. Once the device control information is sent to the base device 102, the device control information may be optionally overwritten, discarded or otherwise erased.

It is appreciated that the memory 204 may be comprised of multiple memory devices using different memory media. For example, the portion of memory 204 may be a memory device that stores the device control information in the DI signal 216, may be a random access memory (RAM), or other volatile memory. The portion of the memory that stores the DI code table 212 and/or the DI code logic 214 may be a different memory device, such as a nonvolatile memory.

The RF transceiver 206 is configured to communicate with the LRC interface 110 of the base device 102. In some embodiments, the functionality of the RF transceiver 206 may be implemented as a separate RF receiver and a RF transmitter. Alternatively, the learning remote control 104 may be configured for two-way communications with the base device 102 using another media, such as infrared or the like. In an IR embodiment, communications between the learning remote control 104 and the base device 102 may be performed with the IR transmitter 208 and the IR receiver 210, or may be performed with an IR transmitter/receiver that is compatible with the LRC interface 110.

When the learning remote control 104 is used to control operation of a designated controlled electronic device 108, the learning remote control 104 detects a device command intended by the user upon actuation of the electronic device identifier button 134 followed by actuation of one or more of the input interface 128 on the learning remote control 104. The DI code logic 214 controls selection of the particular device instruction code information that is associated with a user's intended device command for a designated controlled electronic device 108. The corresponding device instruction code information for that particular controlled electronic device 108 is retrieved from the DI code table 212, and a corresponding emulated device command signal 136 is generated. The IR transmitter 208 then transmits the emulated device command signal 136 to the designated controlled electronic device 108.

That is, actuation of the electronic device identifier button 134 identifies the controlled electronic device 108. Actuation of the one or more of the input interface 128 identifies the user intended operation of the controlled electronic device 108.

The IR receiver 210 is configured to receive the device control signal 106 from one of the remote controls 120 during the learning process. The IR receiver 210 is a very sensitive IR detection device that provides a high degree of signal discrimination so that the received device control signal 106 may be processed in a very accurate manner.

The exemplary base device 102 illustrated in FIG. 2 is a set top box (STB). The STB 102 is a relatively sophisticated electronic media device wherein the processing capacity and processing speed of the processor system 112 are relatively high. Also, the memory 114 is relatively large. The STB 102 comprises a program content stream interface 218, the processor system 112, the memory 114, a program buffer 220, an optional digital video recorder (DVR) 222, a presentation device interface 224, and the LRC interface 110. Other media devices that are configured with embodiments of the remote control command learning system 100 may include some, or may omit some, of the above-described media processing components. Further, additional components not described herein may be included in alternative embodiments The functionality of the STB 102 is now broadly described. A program provider provides program content that is received in one or more program content streams 226. A program content stream 226 typically comprises a plurality of programs multiplexed together. The one or more program content streams 226 are communicated to the STB 102 from a media system sourced from a remote head end facility (not shown) operated by a media provider. Non-limiting examples of such media systems include satellite systems, cable systems, and the Internet. For example, if the program provider provides programming via a satellite-based communication system, the STB 102 is configured to receive one or more broadcasted satellite signals detected by an antenna (not shown). Alternatively, or additionally, the program content stream 226 can be received from one or more different sources, such as, but not limited to, a cable system, a radio frequency (RF) communication system, or the Internet.

The one or more program content streams 226 are received by the program content stream interface 218. One or more tuners 218a in the program content stream interface 218 selectively tune to one of the program content streams 226 in accordance with instructions received from the processor system 112. The processor system 112, based upon a request for a program of interest specified by a user using the learning remote control 104, parses out program content associated with the program of interest.

The program of interest is then assembled into a stream of video and/or audio information which may be stored by the program buffer 220 such that the program content can be streamed out to a media presentation device, such as the television 108a, via the presentation device interface 224. The video portion of the streamed program content may displayed on the display 122 of the television 108a. If the STB 102 is also communicatively coupled to the stereo 108b, the audio portion of the streamed program content may be reproduced as sounds by the speakers 126.

Alternatively, or additionally, the parsed out program content may be saved into the DVR 222 for later presentation. In some STBs 102, the DVR 222 is a non-volatile writable memory with a relatively large capacity. Accordingly, the DI code table 212 can be stored in the digital video recorder DVR 222, thereby reducing the memory capacity of the memory 114. Since the DVR 222 is writable, an updated DI code table 116 can be stored in the DVR 222. Thus, an updated DI code table 116 and/or new instruction code information can be then sent to the learning remote control 104 and saved into the DI code table 212. Further, the DI code table 116 can be used as a backup and/or for sending to other devices.

In some embodiments, the base device 102 sends the device instruction code information as it is learned. The DI code logic 214 is configured to construct the DI code table 212 as the device instruction code information is received. That is, the DI code logic 214 controls population of the DI code table 212 using the device instruction code information provided by the base device 102. In such embodiments, the DI code table 116 stored in the memory 114 of the base device 102 may be optional.

In some embodiments, a plurality of learning remote controls 104 may be available. Accordingly, the DI code table 116 and/or new instruction code information can be sent to the other learning remote controls 104. That is, the learning process only needs to be performed one time using one of the plurality of learning remote controls 104. In some embodiments, the base device generates and stores multiple DI code tables 116 (and/or different device instruction code information). Accordingly, actuation of input interfaces on a second learning remote control 104 correspond to the input interfaces 128 of the first learning remote control 104 which was used to learn the operating commands of the remote control 120.

Different DI code tables 116 (and/or different device instruction code information) may be communicated to different learning remote controls 104 which may differ from each other. For example, one of the learning remote controls 104 may be relatively new, and another learning remote control 104 may be relatively old. Thus, the operation of the new and the old learning remote controls 104 may be different. Accordingly, one of the DI code tables 116 (and/or different device instruction code information) may be configured for the new learning remote control 104 and another one of the DI code tables 116 (and/or different device instruction code information) may be configured for the older learning remote control 104.

Some embodiments of the remote control command learning system 100 may be configured to receive predefined device instruction code information for a particular known controlled electronic device 108 and its associated remote control 120. Thus, the user does not have to go through the learning process to be able to use the learning remote control 104 to control the known controlled electronic device 108. The device instruction code information for the known controlled electronic device 108 may be integrated into the DI code table 212 in the learning remote control 104, or separately stored. The device instruction code information for the known controlled electronic device 108 may be pre-stored in the remote control 120 or the base device 102 prior to delivery to the user. Alternatively, or additionally, new device instruction code information for a known controlled electronic device 108 may be downloaded from the remote source 140 communicatively coupled to the base device 102.

In some embodiments, a menu driven system and/or graphical user interface (GUI) may be used to assist the user when the remote control command learning system 100 is operating in the learning mode. For example, a command confirmation menu and/or GUI may be presented on the display 122. Thus, the user will be able to view visual information that confirms that their intended function is learned by the remote control command learning system 100. Some embodiments may further include features that allow the user to adjust the specified operating function and/or change input interfaces 128 that perform the intended operation, and/or enter or exit the learning function.

In some embodiments, the order of input interface actuations during the learning process may be different. For example, but not limited to, the user may first actuate a input interface 128 on the learning remote control 104, followed by actuation of a corresponding input interface the remote control 120. To illustrate, the "power on/off" button 130 on the learning remote control 104 could be actuated to indicate to the base device 102 that this function is a current function that is to be learned. Then, the user positions and orients the remote control 120a so that when the user actuates the "power on/off" button on the remote control 120, the remote control 120 transmits the device command signal to the learning remote control 104.

In alternative embodiments, the learning function may be initiated in other manners. For example, a selected one or more of the input interfaces 128 may have multiple functions. When the selected input interface 128 is operated in a first manner, a particular function is performed. When the selected input interface 128 is operated in another manner, the learning function is initiated and/or ended. To illustrate, a selected button on the learning remote control 104 could be depressed to perform a particular function. If the same button is depressed and held for a predefined period, such as two or three seconds, to enter or exit the learning function.

It should be emphasized that the above-described embodiments of the remote control command learning system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method to control an electronic device, the method comprising:
receiving a device command signal at a learning remote control, wherein the received device command signal is transmitted from a remote control associated with a controlled electronic device, and wherein the received device command signal is configured to control an operation of the controlled electronic device;
communicating device control information from the learning remote control to a base device, wherein the communicated device control information corresponds to the received device command signal;
communicating a first identifier that is associated with the controlled electronic device from the learning remote control to the base device, wherein the first identifier is associated with a first input interface residing on the learning remote control;
communicating a second identifier from the learning remote control to the base device, wherein the second identifier is associated with at least a second input interface residing on the learning remote control;
determining device instruction code information at the base device, wherein the determined device instruction code information includes information that is configured to cause the learning remote control to generate and transmit an emulated device command signal that is substantially the same as the device command signal, and wherein the determined device instruction code information includes information corresponding to the first identifier and the second identifier;
communicating the determined device instruction code information from the base device to the learning remote control; and
storing the determined device instruction code information in a memory of the learning remote control,
wherein the first identifier is associated with an actuation of the first input interface to identify the controlled electronic device, and wherein the second identifier is associated with an actuation of the second input interface to identify the operation of the controlled electronic device.

2. The method of claim 1, wherein after completion of storing the determined device instruction code information in the memory, the method further comprising:
receiving a first signal from the first input interface;
receiving a second signal from the second input interface;
retrieving the determined device instruction code information in the memory of the learning remote control;
generating the emulated device command signal, wherein the generated emulated device command signal corresponds to the operation of the controlled electronic device; and
transmitting the generated emulated device command signal from the learning remote control to the controlled electronic device.

3. The method of claim 1, wherein prior to receiving the device command signal, the method further comprises:
receiving a first signal from a third input interface, wherein the learning remote control and the base device are configured to begin to operate in a learning mode, and
wherein after storing the determined device instruction code information, the method further comprises:
receiving a second signal from the third input interface, wherein the learning remote control and the base device are configured to exit the learning mode.

4. The method of claim 1, wherein the received device command signal transmitted from the remote control to the learning remote control is transmitted as a first infrared (IR) signal, wherein the device control information communicated from the learning remote control to the base device is communicated as a first radio frequency (RF) communication signal, and wherein the device instruction code information communicated from the base device to the learning remote control is communicated as a second radio frequency (RF) communication signal, the method further comprising:
transmitting the emulated device command signal from the learning remote control to the controlled electronic device as a second IR signal, wherein the second IR signal is substantially the same as the first IR signal.

5. The method of claim 1, wherein prior to communicating the determined device instruction code information from the base device to the learning remote control, the method further comprising:
storing the determined device instruction code information in a device instruction code table residing in a memory of the base device.

6. The method of claim 5, wherein communicating the determined device instruction code information from the base device to the learning remote control comprises:
communicating the device instruction code table from the base device to the learning remote control.

7. The method of claim 5, wherein the learning remote control is a first learning remote control, and further comprising:
communicating the device instruction code table from the base device to a second learning remote control; and
storing the device instruction code table in a memory of the second learning remote control.

8. The method of claim 7, further comprising:
receiving a first signal from a first input interface residing on the second learning remote control, wherein the first input interface on the second learning remote control corresponds to the first input interface of the first learning remote control;
receiving a second signal from a second input interface residing on the second learning remote control, wherein the second input interface on the second learning remote control corresponds to the second input interface of the first learning remote control;
retrieving the determined device instruction code information from the memory of the learning remote control;
generating an emulated device command signal, wherein the generated emulated device command signal corresponds to the operation of the controlled electronic device; and
transmitting the generated emulated device command signal from the second learning remote control to the controlled electronic device.

9. The method of claim 5, wherein the determined device instruction code information is a first device instruction code information, and wherein the controlled electronic device is a first controlled electronic device, the method further comprising:
receiving second device instruction code information from a remote source, wherein the second device instruction code information is configured to control a function of a second controlled electronic device;
storing the second device instruction code information in the device instruction code table; and
communicating the device instruction code table from the base device to the learning remote control.

10. A system to control a controlled electronic device, comprising:
a learning remote control configured to receive a device command signal transmitted from a remote control that is configured to control an operation of the controlled electronic device; and
a base device configured to receive a first identifier, a second identifier, and device control information from the learning remote control, wherein the received device control information includes information corresponding to the device command signal, wherein the first identifier is associated with a first input interface residing on the learning remote control, and the second identifier is associated with a second input interface residing on the learning remote control,
wherein the base device is further configured to determine device instruction code information that is configured to cause the learning remote control to generate and transmit an emulated device command signal in response to the learning remote control receiving a first signal generated by the first input interface and a second signal generated by the second input interface, wherein the emulated device command signal is substantially the same as the device command signal,
wherein the first identifier associated with the first input interface residing on the learning remote control is associated with the controlled electronic device, and wherein the second identifier associated with the second input interface residing on the learning remote control is associated with the operation of the controlled electronic device.

11. The system of claim 10, wherein the learning remote control comprises:
an infrared (IR) receiver configured to receive the device command signal transmitted from the remote control; and
an IR transmitter configured to transmit the emulated device command signal to the controlled electronic device.

12. The system of claim 10, wherein the learning remote control comprises:
a radio frequency (RF) transceiver configured to transmit the first identifier, the second identifier, and the device control information to the base device, and is further configured to receive the device instruction code information from the base device.

13. The system of claim 10, wherein the learning remote control comprises:
a memory configured to store the received device instruction code information.

14. The system of claim 13, wherein a device instruction code table resides in the memory, and wherein the received the device instruction code information is stored in the device instruction code table.

15. The system of claim 10, wherein the base device comprises:
a radio frequency (RF) transceiver configured to receive the first identifier, the second identifier, and the device control information from the learning remote control, and is further configured to transmit the device instruction code information to the learning remote control.

16. The system of claim 10, wherein the base device comprises:
a memory configured to store the determined device instruction code information in a device instruction code table,
wherein the device instruction code table is communicated to the learning remote control.

17. The system of claim 16, wherein the learning remote control is a first learning remote control, and further comprising:
a second learning remote control,
wherein the device instruction code table is communicated by the base device to the second learning remote control.

18. A learning remote control, comprising:
an infrared (IR) receiver configured to receive a device command signal transmitted from a remote control that is configured to control an operation of a controlled electronic device;
a processor system communicatively coupled to the IR receiver and configured to determine device control information corresponding to the received device command signal;
a first input interface communicatively coupled to the processor system and configured to generate a first signal, wherein the first signal includes a first identifier associated with the controlled electronic device;
a second input interface communicatively coupled to the processor system and configured to generate a second signal, wherein the second signal includes a second identifier that is associated with the operation of the controlled electronic device; and
a transceiver configured to transmit the first identifier, the second identifier, and the device control information to a base device, and further configured to receive device instruction code information from the base device,
wherein the received device instruction code information is configured to cause the learning remote control to generate and transmit an emulated device command signal in response to the learning remote control receiving a first signal generated by the first input interface and a second signal generated by the second input interface, and
wherein the emulated device command signal is substantially the same as the received device command signal.

* * * * *